Nov. 24, 1959 K. RADERMACHER 2,913,912
FUEL FEED REGULATION FOR VIBRATORY COMBUSTION GRATES
Filed Feb. 23, 1955 3 Sheets-Sheet 1

Inventor:
KARL RADERMACHER
BY

Nov. 24, 1959  K. RADERMACHER  2,913,912
FUEL FEED REGULATION FOR VIBRATORY COMBUSTION GRATES
Filed Feb. 23, 1955  3 Sheets-Sheet 2

Inventor:
KARL RADERMACHER
BY

Nov. 24, 1959   K. RADERMACHER   2,913,912
FUEL FEED REGULATION FOR VIBRATORY COMBUSTION GRATES
Filed Feb. 23, 1955   3 Sheets-Sheet 3

INVENTOR.
KARL RADERMACHER
BY

United States Patent Office 2,913,912
Patented Nov. 24, 1959

2,913,912

FUEL FEED REGULATION FOR VIBRATORY COMBUSTION GRATES

Karl Radermacher, Strombach, near Gummersbach, Germany, assignor to L. & C. Steinmuller G.m.b.H., Gummersbach, Rhineland, Germany Application February 23, 1955, Serial No. 490,106

Claims priority, application Germany July 20, 1954

2 Claims. (Cl. 74—61)

This invention relates to the control of fuel feeding action of a vibrating or shaking grate.

It is already well known to construct a system for a shaking grate for operation at a constant amplitude of motion and at a much higher frequency of oscillation than is required for a continuous drive, whereby the fuel feed takes place periodically in controllable time intervals.

A usual concomitant of driving or oscillating a shaking grate in this manner is that, as in the case of a flat grate provided with stirring or stoking means, combustion does not take place continuously but exhibits periodic fluctuations. It has heretofore not been practicable, apart from the question of cost, to regulate the action or output of the grate by varying the number of revolutions of the driving motor, which constitutes a part of the driving system, during uninterrupted movement of the grate, because the spread of speed range of commercial motors available for this purpose is too small.

It is, therefore, an object of the present invention to provide means facilitating feeding of fuel on a vibrating grate in such manner as to ensure uniform combustion conditions.

It is another object of the present invention to provide means affording a simplified, yet highly efficient driving system for a vibrating grate wherein relatively strong feeding vibrations are alternated with relatively weaker agitating or stirring vibrations, thus eliminating the possibility of caking or clogging of the fuel being fed along said grate.

It is still another object of the present invention to provide means leading to an effective and sturdy driving system for vibrating fuel feeding grates which is easily controllable and permits variations of the forces applied to the grate both in the direction of feed and substantially transversely thereto while the grate is in operation.

A further object of the present invention is to provide means presenting a novel and compact driving system for vibrating grates which is easily and inexpensively constructed from a minimum number of parts and may be readily installed in existing grate structures for operation or removed therefrom for repairs without undue difficulties or expenditures of time and labor.

More specifically, the invention resides in a construction wherein a grate, which is moved or oscillated in fixed time intervals but with variable periods of actuation, is also vibrated between the major portions of successive periods of actuation with reduced or weaker vibrations, whereby a gentle stirring or stoking of the fuel bed takes place, but substantially no or, at most, only a negligible fuel feed. The driving motor employed in a driving system according to the invention may be a commonly known variable speed motor, an upper speed range thereof being employed for fuel feed and consequent intensification of combustion, while a lower speed range is employed for vibratory stirring action. As a result, output fluctuations, which are usually accompanied by fluctuations in the amount of carbon dioxide produced, are so strongly damped that an almost continuous combustion takes place on the grate.

Such control is basically not restricted to any particular type of driving system but may evidently be used in combination with various driving systems.

A driving system which has been found to be especially suited for use with an apparatus according to the invention includes a fly-wheel or swinging mass drive, which not only exerts forces on the grate in the direction of feed but simultaneously in other directions lying in the same plane. Thus through a suitable arrangement of the grate, there will be transmitted to the fuel layer forces other than those working in the direction of movement, thereby preventing caking or clogging of the fuel.

Such a swinging mass drive can comprise, for example, a number of masses geared in pairs for rotary movement in opposite directions by gears which, contrary to the usual construction, have different diameters. By this means a continuous direction change of the forces working on the grate can be attained.

The same effect can also be obtained through use of an oscillating or swinging mass drive the masses of which rotate with equal velocities, the drive being suspended from the center of gravity of the grate and being pendularly oscillated by means of a suitable device.

In order to bring about a sufficiently sensitive control of the fuel feed and to impart to the fuel as smooth or gradual a movement as possible, the invention further concerns a driving construction the output of which may be infinitely varied between a null value and a predetermined maximum.

In accordance with the invention a swinging mass drive is employed which comprises two pairs of equal masses mounted eccentrically on two pairs of shafts, respectively, located in a suitable housing. The two shafts of each pair of shafts are connected by means of gears for rotation in opposite senses or directions so that the masses of each pair produce centrifugal forces, the resultants of which act only perpendicularly to the planes passing through the respective pairs of shafts. The interconnection of the two shaft pairs is so arranged that a displacement of one of the mass pairs relative to the other is possible.

For this purpose, two interconnected planetary gearing systems may be employed, one of the two internally toothed gears in which one of the planetary gears rotates being fixed to the housing while the second internally toothed gear may be rotated about its axis by means of a worm drive or a lever system and may be fixedly retained in any of its positions. According to the position of this second gear, the locations of the masses of one of the shaft pairs are altered relative to the positions of the masses of the other shaft pair. It is, therefore, possible not only to orient both mass pairs relative to one another in such a manner that the output of the driving system is null, but to alter their relative orientation from the null position to a second position by means of any desired number of intermediate steps in which second position both mass pairs exert forces in the same direction. The resultant sum of these forces serves to produce the previously predetermined maximum output.

These and other objects of the invention will become further apparent from the following detailed description, reference being made to the accompanying drawings, showing preferred embodiments of the invention.

Figure 1:
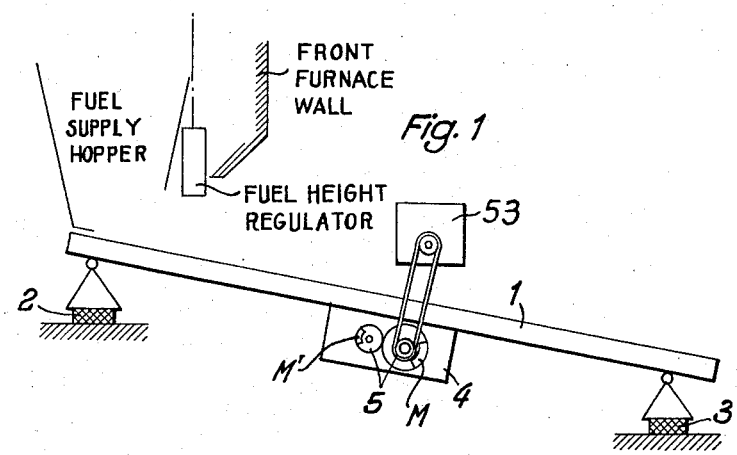
Fig. 1 shows schematically a vibrating grate with a swinging mass drive constructed in accordance with one embodiment of the invention.

Referring now to Fig. 1, it may be seen that grate carrier or support 1 is mounted on resilient metal or spring elements 2 and 3 in such a manner as to be movable in all directions lying in the plane of the drawing. Connected to grate carrier 1 is swinging or oscillating mass drive 4, which, in essence, comprises a pair of masses M and M' mounted individually on a pair of parallel shafts journaled in a suitable housing, the housing being rigidly attached to the grate support in any suitable manner. The shafts are interconnected for rotation in opposite directions by gears 5 which have different diameters, suitable motor means comprising a variable speed motor 53 being provided to drive one of said shafts.

As may be readily understood, the various resultants of the centrifugal forces arising due to the rotation of masses M and M' impart at any given instant a motion to grate support to an extent and in a direction depending on the magnitude and direction of the resultant at that instant. With a grate support mounted at an angle to the horizontal, such motion produces a smooth fuel feed along the grate during part of the oscillating cycle and maintains the fuel in a state of agitation during the remainder of the cycle to prevent caking or clogging of the fuel.

It is, of course, evident that various modifications may be made of the structure of this embodiment. Thus, the gears 5 may have equal as well as unequal diameters and the masses M and M' may be identical or different from one another, depending on the result sought to be attained.

Figure 4:
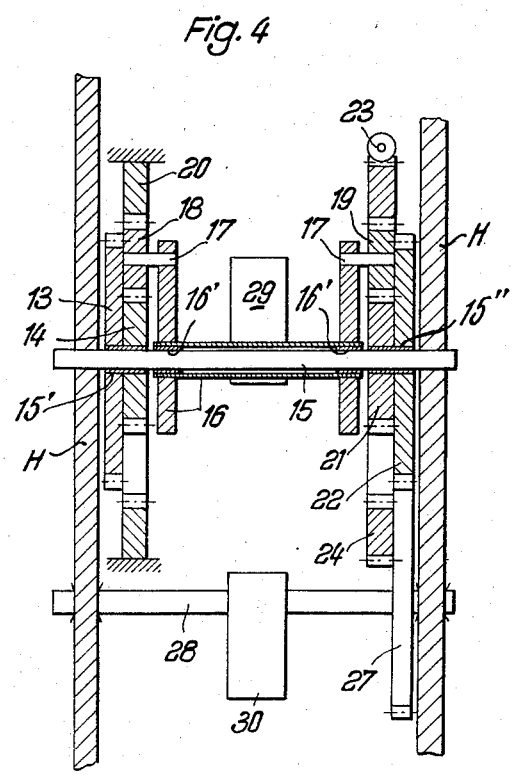
Fig. 4 is a further sectional view of the drive shown in Fig. 2, this view being taken in the direction of the arrows IV—IV.
Figure 2:
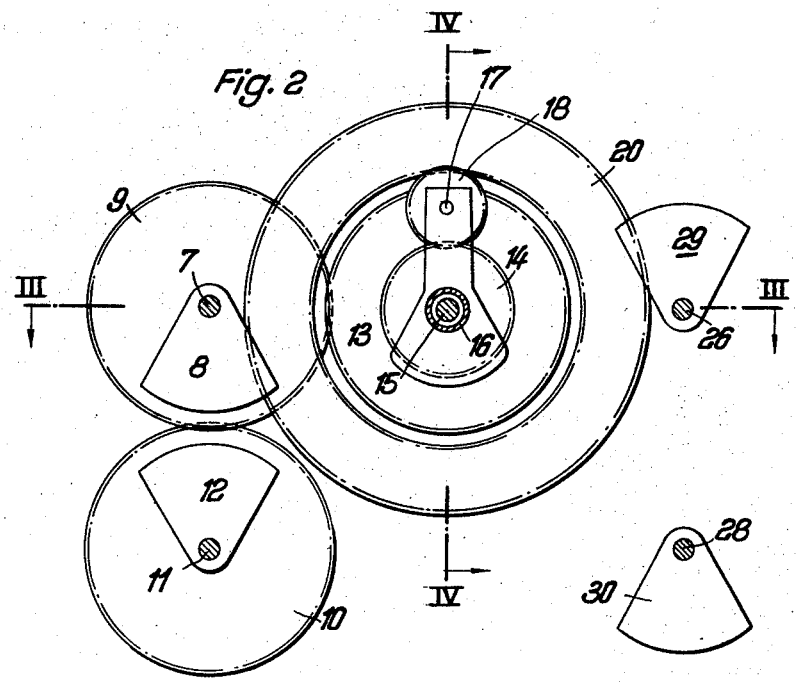
Fig. 2 is a schematic illustration of an infinitely variable swinging mass drive constructed in accordance with a further embodiment of the invention.
Figure 3:
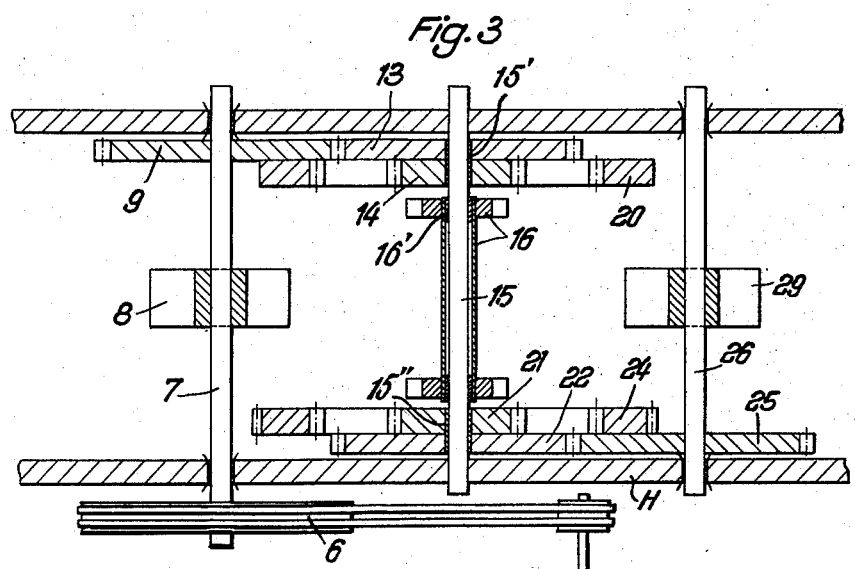
Fig. 3 is a sectional view of the drive shown in Fig. 2, the view being taken in the direction of the arrows III—III.

Having reference now to Figs. 2 to 4, a modified drive is illustrated therein, which drive may be employed in lieu of the drive 4 illustrated in Fig. 1. The drive according to this form of the invention comprises a shaft 7 which carries mass or weight segment 8, the shaft being journaled in bearings provided therefor in housing H. Gear 9 is fixedly mounted on said shaft which is driven by means of a suitable variable speed 54 drivingly connected to pulley 6. The rotation of gear 9 is transmitted from one portion thereof to gear 10 fixedly mounted on shaft 11 also journaled in housing H, which shaft carries mass or weight segment 12. Another portion of gear 9 drives one gear 13 of a rigidly interconnected gear pair 13 and 14, both gears 13 and 14 being rotatably mounted on stationary shaft 15 by means of suitable bearings 15'. Also rotatably mounted on shaft 15 by means of suitable bearings 16' is a double-ended planetary gear carrier 16 provided with spaced axes 17 on which planetary gears 18 and 19 are rotatably affixed.

Planetary gear 18 moves in the space between and interconnects gear 14 and first internal ring gear 20, the latter being fixed to the housing. Planetary gear 19, on the other side of carrier 16, moves in the space between and interconnects second internal ring gear 24 and one gear 21 of a rigidly interconnected gear pair 21 and 22, rotatably mounted on shaft 15 by means of suitable bearing means 15'', ring gear 24 being rotatably adjustable in said housing by means of worm gear 23 actuated by suitable motor means (not shown). The rotation of gear 14 is transmitted through planetary gear 18, planetary gear carrier 16, and planetary gear 19 to gears 21 and 22.

Rotatably journaled in housing H are two shafts 26 and 28 which carry masses 29 and 30, respectively. Affixed to shaft 26 is gear 25 which meshes at one portion thereof with gear 27 affixed to shaft 28. Another portion of gear 25 meshes with gear 22. The motion imparted to shaft 7 is, consequently, transmitted through the above described gearing to shafts 11, 26, and 28 to cause rotation of all four masses concurrently.

From the above it will also be apparent that worm gear 23, which, when inactive, holds ring gear 24 stationary, may be adjusted while the shafts are rotating. Depending, therefore, on the direction and speed of rotation of ring gear 24 relative to the direction and speed of movement of planetary gear 19, the transmission of rotary motion from shaft 11 to shafts 26 and 28 may be so slowed down or speeded up as to cause a change in the locations of masses 29 and 30 relative to masses 8 and 12.

Inasmuch as the vibration or oscillation of the grate depends on the magnitude and direction of the vector sum of the resultants of the centrifugal forces arising due to the rotation of the various masses, it is evident that rotation of ring gear 24 gives rise to a variation of the outwardly directed vibrating forces. As a result of this variation, in any given interval of time there will be a period in which the vibrations are relatively strong, causing fuel to be fed along the grate, and a subsequent period of relatively weaker vibrations, during which latter period fuel feed is minimized while the vibrations are nevertheless sufficient to cause a rather gentle agitation or stirring of the fuel bed to prevent caking or clogging of the fuel on the grate.

Alternatively, of course, worm gear 23 may be employed to so position masses 29 and 30 prior to operation of the driving system as to set a predetermined maximum limit to the vibrating forces.

A further refinement of the invention arises due to the use of a variable-speed motor 54 as the means for driving shaft 7 through sheave or pulley 6. In this modification, the upper speed ranges of the motor are employed to give rise to relatively strong vibrations (fuel feed) and the lower speed ranges are employed to give rise to relatively weaker vibrations (stirring with negligible fuel feed).

Figure 5:
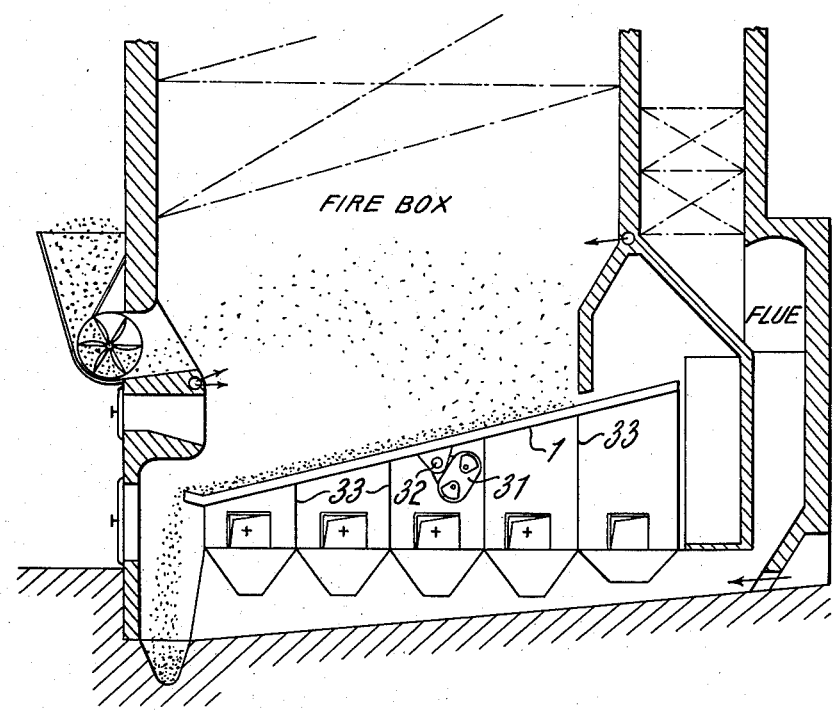
Fig. 5 is a schematic illustration, partly in section, of a further modified form of vibrating grate.

Referring now to Fig. 5, it will be seen that a swinging mass drive or system 31, corresponding either to the drive 4 of Fig. 1 or to the drive 7–9 etc. of Figs. 2 to 4, may be pendularly suspended from the grate support 1. To this end, a shaft 32 is rotatably carried by the grate support, and the drive 31 which, of course, is provided with gears and with its own motor or like power means to rotate the eccentric masses, is fixed or rigidly connected to said shaft. Suitable auxiliary, exteriorly located motor or driving means (not shown) are connected to the shaft 32 to oscillate the same. The grate support 1, in order to be displaceable due to the effect of the mass drive 31, is mounted on and supported by a plurality of resilient or flexible metal plates 33 corresponding to the spring or like elements 2 and 3 shown in Fig. 1.

The entire arrangement is located near the floor of the combustion chamber or fire box, fuel being fed into said chamber and onto the rear or uppermost end of the grate located on the support 1 by means of a rotating spreader or impeller of known construction. Air is introduced, as indicated by the arrows in Fig. 5, into the combustion chamber through suitable nozzles or like inlet devices located at the front and rear walls of said chamber.

Inasmuch as the mass drive in toto takes part in the oscillatory movements of the shaft 32, the direction of action of the masses of the drive and, thus, the vibration of the grate are continuously altered. As will be readily realized, the oscillatory movement of the shaft may itself be continuous or periodically interrupted. Moreover, said oscillatory movement may be employed in such a manner as to ensure that the mass drive 31 acts for a predetermined, relatively long interval or period of time in a given direction, which may be necessary due to the type of combustion being carried out and/or due to the characteristics of the fuel being burned. Stated in other words, the rhythm of the mass drive motion together with the shaft 32 may be preadjusted in accordance with the desired operating conditions.

Thus it may be seen that the invention consists in general of the combination of fuel feeding grate means to be used in a combustion plant with eccentric or vibratory means to impart oscillatory or vibratory motions thereto, and drive means to actuate said eccentric means, which eccentric means preferably comprises weight means or masses eccentrically mounted on shafts rotated by said drive means, which drive means in turn may be a variable speed motor.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a driving system for use in connection with means to be vibrated; a housing, a shaft fixedly mounted in said housing, a first pair of external gears coaxially and rotatably mounted on said shaft within said housing and interconnected for joint rotation about said shaft, a first internal ring gear mounted in said housing concentrically surrounding one gear of said first pair of external gears, a second pair of external gears coaxially and rotatably mounted on said shaft within said housing and spaced from said first pair of gears and interconnected for joint rotation about said shaft, a second internal ring gear rotatably mounted in said housing and concentrically surrounding one gear of said second pair of external gears, a planetary gear carrier rotatably mounted on said shaft intermediate said pairs of external gears, a first planetary gear mounted on said carrier and interconnecting said first ring gear and said one gear of said first pair of external gears, a second planetary gear mounted on said carrier and interconnecting said second ring gear and said one gear of said second pair of external gears, a first pair of shafts rotatably mounted in said housing and geared together for rotation in opposite directions, eccentric weight means on each shaft of said first pair of rotatable shafts, one shaft of said first pair of rotatable shafts being geared to the other gear of said first pair of external gears, a second pair of shafts rotatably mounted in said housing and geared together for rotation in opposite directions, eccentric weight means on each shaft of said second pair of rotatable shafts, one shaft of said second pair of rotatable shafts being geared to the other gear of said second pair of external gears, and means in said housing for rotatably adjusting said second ring gear to thereby regulate the position of said weight means on said second pair of rotatable shafts relative to said weight means on said first pair of rotatable shafts and to predetermine thereby the vibratory action of said system.

2. In combination, a vibratory system comprising a housing, a shaft fixedly mounted in said housing, a first pair of external gears coaxially and rotatably mounted on said shaft within said housing and interconnected for joint rotation about said shaft, a first internal ring gear mounted in said housing concentrically surrounding one gear of said first pair of external gears, a second pair of external gears coaxially and rotatably mounted on said shaft within said housing and spaced from said first pair of gears and interconnected for joint rotation about said shaft, a second internal ring gear rotatably mounted in said housing and concentrically surrounding one gear of said second pair of external gears, a planetary gear carrier rotatably mounted on said shaft intermediate said pairs of external gears, a first planetary gear mounted on said carrier and interconnecting said first ring gear and said one gear of said first pair of external gears, a second planetary gear mounted on said carrier and interconnecting said second ring gear and said one gear of said second pair of external gears, a first pair of shafts rotatably mounted in said housing and geared together for rotation in opposite directions, eccentric weight means on each shaft of said first pair of rotatable shafts, one shaft of said first pair of rotatable shafts being geared to the other gear of said first pair of external gears, drive means operatively connected to at least one shaft of said first pair of shafts, a second pair of shafts rotatably mounted in said housing and geared together for rotation in opposite directions, eccentric weight means on each shaft of said second pair of rotatable shafts, one shaft of said second pair or rotatable shafts being geared to the other gear of said second pair of external gears, and means in said housing for rotatably adjusting said second ring gear to thereby regulate the position of said weight means on said second pair of rotatable shafts relative to said weight means on said first pair of rotatable shafts and to predetermine thereby the vibratory action of said system.

References Cited in the file of this patent

UNITED STATES PATENTS

| | | |
|---|---|---|
| 2,051,559 | Keeley | Aug. 18, 1936 |
| 2,144,382 | Lincoln | Jan. 17, 1939 |
| 2,334,368 | Wolf | Nov. 16, 1943 |
| 2,367,070 | Symons | Jan. 9, 1945 |
| 2,445,175 | Hittson | July 13, 1948 |
| 2,697,357 | Wettlaufer | Dec. 21, 1954 |
| 2,766,629 | Booth | Oct. 16, 1956 |

FOREIGN PATENTS

| | | |
|---|---|---|
| 148,129 | Australia | Sept. 9, 1952 |